March 10, 1936.    W. R. SMITTLE    2,033,403
SHAFT PACKING
Filed April 26, 1933
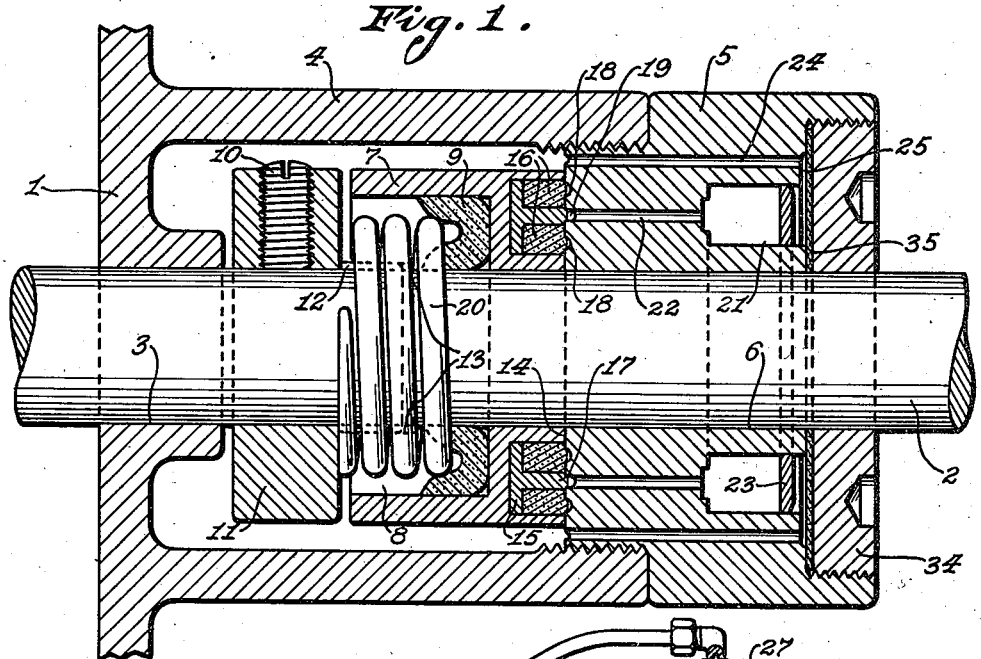
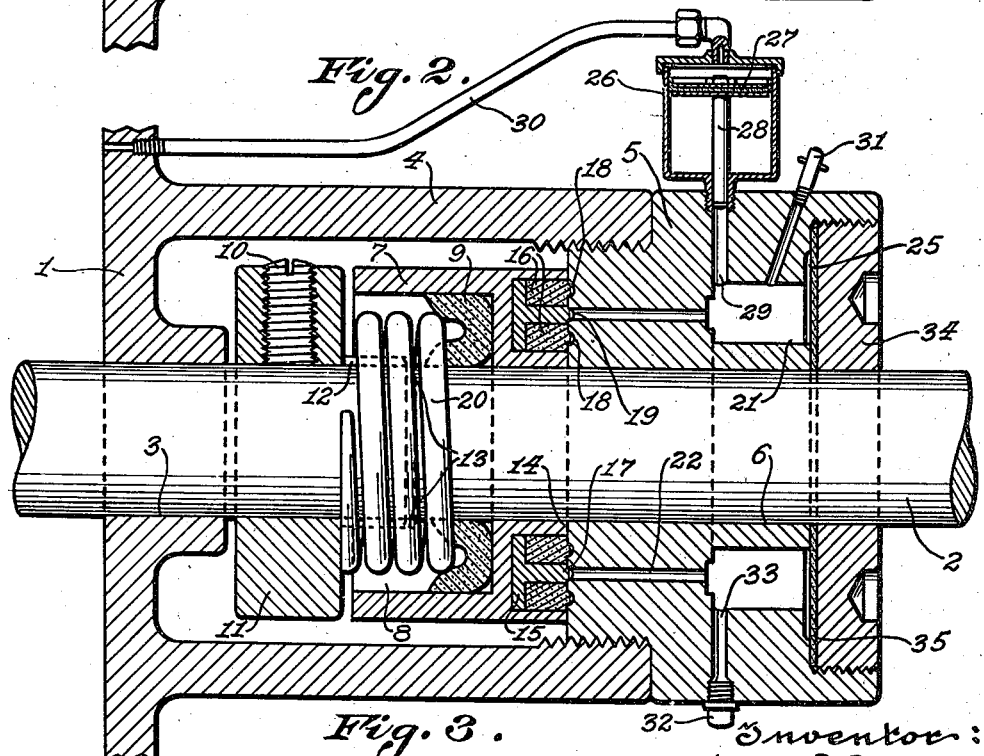
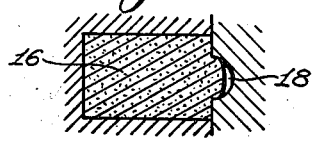
Inventor:
WALTER R. SMITTLE,
By John H. Bruninga
His Attorney.

Patented Mar. 10, 1936

2,033,403

UNITED STATES PATENT OFFICE 2,033,403

SHAFT PACKING

Walter R. Smittle, St. Louis, Mo.

Application April 26, 1933, Serial No. 667,987

12 Claims. (Cl. 286—7)

This invention pertains to packings and particularly packings which may be used in such situations where a shaft, or similar rotatable element, passes through the wall of a housing in which a fluid under pressure is contained.

There are many situations in which it is necessary to pass a shaft through the wall of a housing containing the fluid pressure in which it is highly important that leakage of the fluid, even in small amounts, be prevented. Such a situation for instance may be found in an oil pump used in connection with an oil burner. In that case a small leak may cause the accumulation of a considerable quantity of oil after some time so that a great fire risk would accompany such a leak. Another case is found in certain oil refining processes wherein inflammable oils are pumped at a high temperature and pressure. At such high temperatures a small leak may cause a jet of hot oil which upon escaping into the atmosphere immediately takes fire.

One of the objects of this invention, therefore, is to provide a packing for a rotatable member which offers the highest degree of safety against leaks.

Another object is to provide such a packing which may be used under very high fluid pressures.

Another object is to provide such a packing which may be used with fluids at high temperatures.

Another object is to provide such a packing with means for cooling the parts adjacent the seal.

It has been found that when a movable element, such as a rotating shaft, is to be packed against leakage of fluid pressure there is a tendency for the fluid under pressure to enter between the mutually engaging relatively movable faces at which the seal is to be made. Upon such entry the fluid tends to form a film between those faces. If such a film is established of sufficient extent to cover the entire sealing face, or, in other words, to extend entirely through the seal, leakage will result. It has been found that if means are provided which are effective to interrupt such a film leakage can be effectively prevented. It has further been found that such an oil film can be interrupted by grooving one, or both, of the sealing faces, by forming one, or both, of the sealing faces of different portions of different materials, or by establishing between those faces a counter tendency to establish a leakage in the opposite direction as will be more fully explained hereinafter.

In accordance with this invention one or more of the above mentioned methods for preventing leakage may be embodied in the packing device.

A further object is to provide a method for operating such a packing which will effectively prevent leakage.

Further objects will appear from the following description when read in connection with the accompanying drawing, in which:—

Figure 1 is a longitudinal section of a shaft packing embodying this invention;

Figure 2 is a similar view showing a modified form of the device;

Figure 3 is an enlarged detail illustrating the action at the sealing surface.

Referring now to the drawing 1 designates a housing in which a fluid under pressure may be contained, such as for instance, a pump housing. 2 designates a shaft, or similar rotatable element, passing through an opening 3 in the housing 1. The housing 1 may be provided with an outwardly extending enclosure 4 projecting therefrom in the direction of the shaft 2 and adapted to enclose the working parts of the packing. Removably mounted so as to close the outer end of the enclosure 4 is a head 5 which is also provided with a bore 6 through which the shaft 2 may pass.

Loosely mounted on the shaft 2 within the enclosure 4 is a sleeve 7 having an enlarged recess 8 surrounding the shaft and adapted to receive a packing ring 9. The purpose of the ring 9 is to effect a permanent seal between the sleeve 7 and the shaft. This ring may be constructed of rubber composition, or the like, and so as to have a V-shape cross section, providing an easily flexible, annular channel form, as shown in the drawing, in order that the fluid pressure acting on the interior faces of the V may force the packing into close contact with both the shaft and the sleeve. Where the packing is used for fluids under high temperatures the ring 9 may be constructed of asbestos composition or other materials capable of standing high temperatures without deterioration. Secured to the shaft 2 by means of a set screw 10, or other suitable fastening means, is a collar 11 provided with one or more outwardly projecting lugs 12 indicated in dotted lines in the drawing. These lugs are arranged to engage in matching recesses 13 in the rear edge of the sleeve 7. The purpose of this construction is to securely lock the sleeve 7 to the shaft so as to cause it to rotate therewith.

The outer end or the right-hand end, as shown in Figures 1 and 2, of the sleeve 7 is provided with a bearing face 14 adapted to contact with a similar face on the head 5 to provide a movable seal against the fluid pressure. The face 14 is shown as radial in the drawing. It will be understood, however, that it may be made conical, or of other non-cylindrical form. As shown in the drawing, the bearing face 14 is composed of a plurality of different portions of different materials. In the embodiment shown these different portions are arranged in radial succession so that a leakage film must encounter the different materials in succession in order to pass through the seal. In the embodiment shown the sleeve 7 has formed in the outer end thereof an annular recess which has cast therein a ring 15 of lead, or other soft metal preferably a good bearing metal. The ring 15 may be cast originally to fill the entire recess in the sleeve, or it may be cast in the form illustrated in the drawing. In either case there is then formed one or more annular recesses adapted to receive rings 16 of leather, or other non-metallic material. In the embodiment shown there are two leather rings 16 with an intermediate annular portion 17 of the ring 15 interposed therebetween and forming a part of the bearing face 14. The sleeve 7 itself may be formed of brass or bronze, or similar semi-soft metal also preferably a bearing metal.

The head 5 is provided with an inner bearing face adapted to engage the face 14 of the sleeve 7. This face of the head 5 is formed to match the face 14 in all respects, except that it is provided with a series of annular grooves. The inner and outer groove which are collectively indicated at 18 are positioned opposite the rings 16 of the sleeve 7, while the intermediate groove 19 is positioned opposite the annular projection 17 of the ring 15.

These grooves provide a bearing surface for the head 5 which is interrupted at intervals in a radial direction, or in other words along the path which leakage must follow. It has been found that by thus interrupting the bearing surface there is a tendency to interrupt any film of fluid which may form between these bearing faces. When such a film is interrupted the tendency to leakage is usually effectively overcome. It has also been found that when one of the bearing surfaces is formed with successive portions of different materials there is a like tendency to interrupt any film of fluid formed between the bearing surfaces. This is probably due to the fact that the contact conditions which obtain at points of contact between different materials vary with respect to one another. It may be said that the degree of contact is different with different materials. Where, as in the present case, the same bearing face is composed of successive sections of different materials, there must be a difference in the degree of contact between those portions where metal and metal come together and those other portions where metal and leather come together. It is clear that under such circumstances the continuity of any leakage film will be interrupted. This is particularly true if a soft or yielding material, such as leather, provides a portion of the surface making contact with a metallic surface of the opposing face. When the surface of one face is interrupted as by grooves and the opposite portion of the other face is formed of a yielding material, such as leather, the effect indicated in Figure 3 is obtained wherein the material of the ring 16 tends to bulge into the groove 18. This not only provides a sharp corner in the leakage path, but it forms a relatively sharp edge on the one face which is maintained in contact with a corresponding groove in the yielding material of the opposite face so that the relative rotary movement of these two faces produces a continuous cutting action tending to sever any fluid film which may tend to leak between the faces. Accordingly means are provided whereby such a film is effectively interrupted and accordingly no continuous movement of the fluid through the space between the two bearing surfaces can take place.

In order to maintain the bearing faces yieldingly in contact with one another a spring 20 may be provided acting between the collar 11 and the sleeve 7 so as to force the latter into contact with the head 5. It will be noted, however, that as the opening 3 through which the shaft emerges from the housing 1 is not tight against leakage the fluid pressure in the housing will also be active within the enclosure 4. The pressure being active on all the rear faces of the sleeve 7 will tend to force that sleeve outwardly against the head 5. If the fluid pressure in the enclosure 4 is very high, this action may cause an excessive pressure between the bearing faces of the sleeve 7 and the head 5 so that excessive friction and wear may be produced thereby. In order to overcome this effect the head 5 may be provided with a recess 21 preferably annular in form from which one or more ducts 22 lead into the groove 19 so as to put said groove into communication with the chamber 21. This chamber may be filled with grease or other fluid material, preferably a lubricant, and a pressure ring 23 which is loosely fitted in the chamber 21 may be arranged to rest against the material in said chamber. The head 5 may further be provided with one or more ducts 24 and 25 placing the outer end of the chamber 21 in communication with the interior of the enclosure 4 so that the pressure in said enclosure becomes active in the chamber 21 and this pressure is distributed by the ring 23 over the material contained in said chamber. This material passes through the duct 22 and fills the groove 19. In the groove 19 this material, being under the pressure in the enclosure 4, exerts its pressure on the sleeve 7 so as to counteract at least in part the pressure of the fluid on the inner surfaces of said sleeve. The effective area of the sleeve 7 which is exposed to pressure in the groove 19 may be adjusted so as to counterbalance any desired portion of the pressure on the sleeve 7. When very high pressures are used the arrangement of Figure 2 may be employed. In this arrangement instead of putting the chamber 21 in direct communication with the interior of the enclosure 4 a device for stepping up the pressure may be interposed. This may take the form of a cylinder 26 having movably mounted therein a piston 27 adapted to operate a plunger 28 which is movable in a cylindrical duct 29 communicating with the chamber 21. The pressure within the housing 1, or the enclosure 4, may be conducted by a suitable duct 30 to the cylinder 26 above the piston 27. This pressure tending to move said piston downwardly in its cylinder is transmitted to the plunger 28 which in turn compresses the fluid material in the chamber 21. On account of the greater area of the piston 27 over that of the plunger 28 the pressure exerted by the latter in the chamber 21 will be increased in proportion. This ratio of increase of pressure may be so adjusted in relation to the area of the sleeve 7 exposed to said pressure within the groove 18 as effectively to balance the pressure on the inner surfaces of said sleeve. An effective practice would be to so proportion these pressures as to very nearly balance the inner pressures on the sleeve 7. In that case the pressure on the bearing faces will be determined by the spring 20. A recharging plug 31 may be provided for replenishing the material in the chamber 21.

It will be noted that this arrangement not only balances the pressure on the bearing faces but it also introduces a counter pressure between the bearing faces acting to oppose any tendency to leakage on the part of the fluid which is to be sealed. If a comparatively heavy grease is used for this purpose, a very effective seal is provided when such thin fluids as gasoline or the like are to be handled.

It is, of course, not necessary that the pressure in the housing 1 be relied upon to furnish the balancing pressure in the chamber 21. The cylinder 26 may be connected with any other suitable source of pressure, or this cylinder may be eliminated and the duct 29 connected directly to a source of adequate pressure. Where fluids in the housing 1 must be handled at high temperatures the chamber 21 may be used to provide a cooling effect. The cylinder 26 being disconnected and the plug 32 normally closing, a lower duct 33 to the chamber 21, may be removed. An outside source of circulating medium may then be connected to the ducts 29 and 33 and a cooling fluid circulated through the chamber 21, the ducts 18 and the groove 19. For instance a suitable oil might be used for this purpose which, after passing through the chamber 21, might be subjected to any well known cooling process before being recirculated. In this manner the head 5 may be kept cool and accordingly the temperature of the bearing faces be maintained within practical temperatures. The chamber 21 being sealed at its outer end by a plug 34 and a gasket 35 may be opened at any time for cleaning or for access for any other purpose.

It will be seen, therefore, that this invention provides a packing capable of successfully performing its functions. Means are provided which effectively counteract any tendency to produce a film of the fluid to be sealed extending through the space between the bearing faces. The means for accomplishing this may take the form of an interrupted bearing face, or a face having different portions of different materials, or means for introducing counter pressure between those faces, or any desired combination of any of these means. Not only is the tendency to form a film successfully counteracted but the pressures on the bearing faces may be controlled so that excessive friction and wear may be eliminated. The mechanism is simple and inexpensive in its construction and rugged and durable in service. The arrangement of the chamber 21 provides for adjusting the counterpressure as desired and also provides for effective cooling so that the bearing faces at which the seal is to be made may be maintained in the best possible condition for service.

While certain theories of action have been used in the description, this has only been for the purpose of explanation and it is understood that the invention is not limited to any particular theory of operation. Furthermore while the device has been described as a unitary device, it will be understood that individual features or subcombinations thereof may be useful by themselves without reference to the other features, or the complete combination, and it is understood that the employment of such individual features and subcombinations of features is contemplated by this invention, and within the scope of the appended claims. It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In an apparatus having a shaft passing through an opening in a housing adapted to contain sealed therein a fluid under pressure, a packing for the shaft comprising, a bearing element on the housing having a non-cylindrical bearing face, a second bearing element on the shaft having a bearing face matching that of said first element, one of said elements being subject to the fluid pressure in the housing to urge it against the other, and means for introducing a fluid of the pressure of the sealed fluid between said faces adapted to limit the bearing pressure.

2. In an apparatus having a shaft passing through an opening in a housing adapted to contain sealed therein a fluid under pressure, a packing for the shaft comprising, a bearing element on the housing having a non-cylindrical bearing face, a second bearing element on the shaft having a bearing face matching that of said first element, one of said elements being subject to the fluid pressure in the housing to urge it against the other, and means for introducing a fluid of the pressure of the sealed fluid between said faces, said parts being proportioned to adjust the pressure between said faces to a predetermined value such as to limit the bearing pressure.

3. In an apparatus having a shaft passing through an opening in a housing adapted to contain sealed therein a fluid under pressure, a packing for the shaft comprising, a bearing element on the housing having a non-cylindrical bearing face, a second bearing element on the shaft having a bearing face matching that of said first element, one of said elements being subject to the fluid pressure in the housing to urge it against the other, one of said faces having a recess, a lubricant chamber in communication with said recess, a lubricant in said chamber, and means for introducing a fluid of the pressure of the sealed fluid into said chamber so as to force the lubricant into said recess adapted to limit the bearing pressure.

4. In an apparatus having a shaft passing through an opening in a housing adapted to contain sealed therein a fluid under pressure, a packing for the shaft comprising, a bearing element on the housing having a non-cylindrical bearing face, a second bearing element on the shaft having a bearing face matching that of said first element, one of said elements being subject to the fluid pressure in the housing to urge it against the other, means for transforming the pressure of the sealed fluid, and means for introducing a fluid under the transformed pressure between said faces adapted to limit the bearing pressure.

5. In an apparatus having a shaft passing through an opening in a housing adapted to contain a fluid under pressure, a packing for the shaft comprising, a bearing element on the housing having a non-cylindrical bearing face, a second bearing element on the shaft having a bearing face matching that of said first element, one of said elements being subject to the fluid pressure in the housing to urge it against the other, one of said faces having a recess, a lubricant chamber in communication with said recess, and inlet and outlet connections to said chamber whereby the lubricant may be circulated for cooling said bearing elements.

6. In an apparatus having a shaft passing through an opening in a housing adapted to contain a fluid under pressure, a packing for the shaft comprising, a bearing element on the housing having a non-cylindrical bearing face, a second bearing element on the shaft having a bearing face matching that of said first element, one of said elements being subject to the fluid pressure in the housing to urge it against the other, one of said faces being composed of radially successive annular portions of different materials, one of said faces having a recess, a lubricant chamber in communication with said recess, and means for introducing a fluid other than the lubricant under an active pressure into said chamber so as to force the lubricant into said recess adapted to limit the bearing pressure.

7. A shaft packing, comprising, a stationary bearing element having a non-cylindrical bearing face, and a second bearing element secured to rotate with the shaft and having a bearing face matching that of said first element, one of said faces being composed of radially successive portions of metal and leather providing varying degrees of contact adapted to interrupt a leakage film between said faces.

8. A shaft packing, comprising, a stationary bearing element having a non-cylindrical bearing face, and a second bearing element secured to rotate with the shaft and having a bearing face matching that of said first element, one of said faces being composed of radially successive portions of lead and leather providing varying degrees of contact adapted to interrupt a leakage film between said faces.

9. In combination with a casing in which a fluid under pressure is sealed, and a shaft passing through a wall of said casing to the outside thereof; a fixed radial bearing in said casing, a sealing collar mounted on said shaft to rotate therewith and having a radial face adapted for sealing engagement with said bearing, said collar being acted upon by the pressure of the fluid in said casing to force it against said bearing, and means conducting a fluid under the pressure of the sealed fluid to the sealing face of said collar so as to counteract its pressure against said bearing.

10. In combination with a casing in which a fluid under pressure is sealed, and a shaft passing through a wall of said casing to the outside thereof; a fixed radial bearing in said casing, a sealing collar mounted on said shaft to rotate therewith and having a radial face adapted for sealing engagement with said bearing, said collar being acted upon by the pressure of the fluid in said casing to force it against said bearing, means for stepping up the pressure of the sealed fluid, and means conducting a fluid under the stepped-up pressure to the sealing face of said collar so as to counteract its pressure against said bearing.

11. In combination with a casing in which a fluid under pressure is sealed, and a shaft passing through a wall of said casing to the outside thereof; a fixed radial bearing in said casing, a sealing collar mounted on said shaft to rotate therewith and having a radial face adapted for sealing engagement with said bearing said collar being acted upon by the pressure of the fluid in said casing to force it gainst said bearing, means for supplying a lubricant to the sealing face of said collar, and means applying the pressure of the sealed fluid to said lubricant.

12. In combination with a casing in which a fluid under pressure is sealed, and a shaft passing through a wall of said casing to the outside thereof; a fixed radial bearing in said casing, a sealing collar mounted on said shaft to rotate therewith and having a radial face adapted for sealing engagement with said bearing, said collar being acted upon by the pressure of the fluid in said casing to force it against said bearing, means for supplying a lubricant to the sealing face of said collar, means for stepping-up the pressure of the sealed fluid, and means applying the stepped-up pressure to said lubricant.

WALTER R. SMITTLE.